United States Patent [19]

Smith et al.

[11] Patent Number: 4,888,234

[45] Date of Patent: Dec. 19, 1989

[54] FORMABLE FIBER COMPOSITE

[75] Inventors: Gerald J. Smith; Elwood G. Trask, both of Auburn, Me.; Paul Ellis, Denver, Colo.; Jon Johnston, Denver, Colo.; Brian Campbell, Denver, Colo.; Leon Rorie, Denver, Colo.

[73] Assignee: Gates Formed-Fibre Products, Inc., Auburn, Me.

[21] Appl. No.: 161,224

[22] Filed: Feb. 17, 1988

Related U.S. Application Data

[63] Continuation of Ser. No. 887,153, Jul. 17, 1986, abandoned.

[51] Int. Cl.⁴ .............................................. B32B 5/02
[52] U.S. Cl. ..................................... 428/234; 28/107; 427/299; 427/316; 428/235; 428/236; 428/247; 428/252; 428/286; 428/287; 428/290; 428/300; 428/301
[58] Field of Search ............... 428/234, 235, 236, 247, 428/252, 286, 287, 290, 300, 301; 28/107; 112/420, 163, 262.1; 427/299, 316

[56] References Cited

U.S. PATENT DOCUMENTS 4,622,253 11/1986 Levy .................................. 428/234

Primary Examiner—Marion C. McCamish
Attorney, Agent, or Firm—C. H. Castleman, Jr.; H. W. Oberg, Jr.

[57] ABSTRACT

A composite structural material and a method of making it, which material is thermoformable and capable of being rigidified by application of a resin, and which is useful in certain electronics applications because of a metallic layer incorporated within the structure. A layer of a selected metal is needle punched onto a fibrous batt of selected synthetic thermoplastic fibers, which is then thermoformed to a desired shape and rigidified by contacting with, and being embedded in, a suitable resin. Specific applications of the use of this composite include a parabolic dish-shaped antenna, an electromagnetic interference shield for electronic equipment, and a radioactive emission shield.

33 Claims, 6 Drawing Sheets

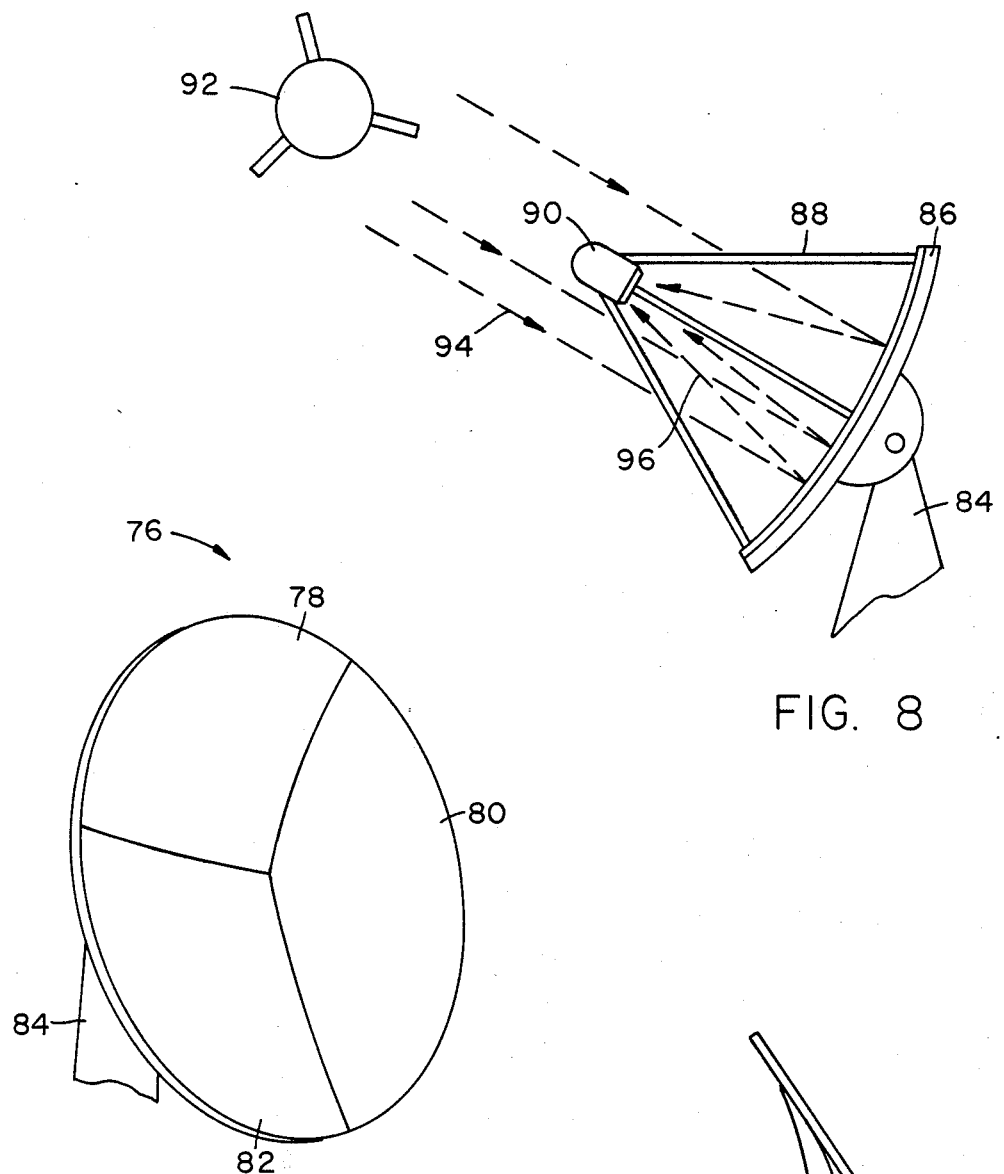
FIG. 8
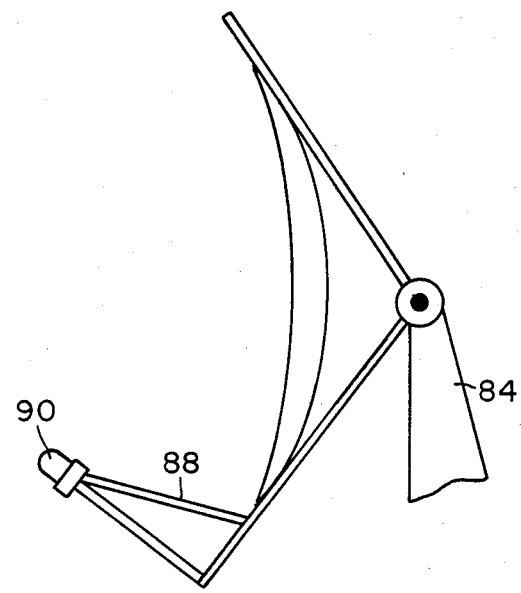
FIG. 7
FIG. 9

FORMABLE FIBER COMPOSITE

This is a continuation of Ser. No. 887,153, filed Jul. 17, 1986, now abandoned.

BACKGROUND OF THE INVENTION

The invention relates to a structural material and more particularly relates to a composite using multiple component materials to fabricate the resulting structural material.

In the past, several techniques have been used to produce materials useful in providing a rigid or semi-rigid wall, housing, or other structural piece. These techniques have included the making of structural sections from sheet metal, or from casting plastics, or from using any other material that would give the best combination of strength and weight for a given structural use. Since very few single materials are exceptionally versatile, it became natural to combine different materials into structural composites in order to combine the most desirable qualities of each type of material in the composite. Examples of some materials that could be combined into composites were screens made out of metals or plastics, woven textile fabrics, resins that would harden after they had been cured, plastic films and sheets, layers of various metals of various thicknesses, or different types of foams that would harden and become rigid when they cured. These different types of structural materials would be held together either by embedding, by adhesives, or by some kind of mechanical means, such as by stapling or tacking.

In many applications, there arises a need for a structural material that is capable of being set against a selected contour or shape, and which will then permanently retain that contour or that shape. A simple example is that of pressing a sheet of heated plastic against the surface of a mold. However, a single structural material, such as a sheet of plastic, is not versatile enough to meet many of the structural or electrical requirements of different applications. Therefore, there is a need for a structural composite made up of different materials, which is capable of being moldable or conformable, and yet has more versatility in the end-product uses to which it can be put than ordinary conformable materials alone.

Many specific attempts at meeting this need have been tried. In general, composites contain two or more distinct ("distinct" here meaning formulated from a distinct manufacturing process) materials as a unified combination. Thus, efforts have included embedding multifiber or wire substrates into a reinforcing matrix. In another approach, fiberglass cloth has been mixed with a resin, the mixture applied over a metallic screen, and then more resin applied over the entire composite, and allowed to solidify. Alternatively, a thin sheet of metal would be adhered or affixed to a plastic mounting plate, having a hollow section that could then be filled out with a foam or another suitable resin. Another approach was to prepare a batt of nonwoven fiber of a synthetic resin, which would soften when subjected to heat and then tack this batt onto a metallic foil to form a panel, which would then have a tar or adhesive applied to the outside of the panel. Still another approach was to take a resin that would harden upon curing, but to add glass fibers to the resin before it did cure and harden. The common element in all these approaches is that a matrix contains a reinforcement.

These approaches had many shortcomings. The method of production would be too expensive, or the materials used in the composite would be too expensive, or the final product might not be rigid enough or strong enough as a structural material. Also, the composite might not be capable of being molded or conformed to certain specific desired shapes, or the composite might not be lightweight enough for a given application. A related concern arises in the field of electronics, where it is frequently desirable to have a structural material that has a metallic portion in order to act as a shield or as a reflector, depending on the given application. A desirable material, therefore, should be relatively inexpensive, lightweight, strong, be capable of being molded or conformed to desirable shapes, and in certain electronic applications, have a metallic component. The reinforcing component also should have a high ratio of length to diameter (aspect ratio), should be stronger than the matrix, should have a higher modulus of elasticity, and should readily form a bond with the material of the matrix. The present invention overcomes prior shortcomings and meets these needs.

It is an object of the present invention to provide a versatile structural material, which can be used in a wide variety of structural applications. It is a further object of the invention to provide a structural material, which can be used in electronic applications. It is a further object of this invention to provide a material that can be used in electronic applications as a shield or as a reflector. It is yet a further object of this invention to provide a material that can be used to attenuate radioactive emissions. It is still a further object of this invention to provide a material capable of being moldable or conformable to a wide variety of different shapes and sizes, without tearing or breaking during the production process. Other objects of this invention are to provide a structural material, which is lightweight, sufficiently strong in relation to its weight, and sufficiently inexpensive to manufacture in relation to its weight and its strength.

This invention features a reinforcing substrate of textile fibers that can readily have attached to them a variety of different metallic or nonmetallic foils, which can be molded or conformed against a given shape using heat molding techniques, and which can be rigidified by embedding it in a suitable resin, foam, or adhesive.

An advantage of this invention is that a metallic or nonmetallic foil can be attached to a fibrous reinforcing substrate to produce a foil-substrate composite, which can be drawn or shaped without tearing the foil. Another advantage is that when suitable heat-moldable or thermoplastic textile fibers are used for the substrate, the foil-substrate composite can be heat molded to a wide variety of desired shapes. Another advantage of this invention is the ability to use and incorporate a metallic layer in a structural material, particularly for various electronics applications. A further advantage of this invention is the ability to rigidify the foil-substrate composite to provide a high degree of strength in relation to the composite's weight. Yet another advantage of this invention is the ability to incorporate a suitable metal for the shielding of radioactive emissions. It is yet another advantage of this invention that a given version of the foil-substrate composite can be mass produced, thereby making it more economical to manufacture.

SUMMARY OF THE INVENTION

The present invention overcomes the problems and satisfies the needs previously considered by providing a variety of structural material products that have in common a nonwoven web of fibers. Conceptually, the web is a starting point. The web can be any type of fibers, but preferably contains at least one type of thermoplastic synthetic resin fiber. The web is generally a webbed batt of nonwoven fibers, and acts as a substrate.

To the web there can be affixed a metallic or nonmetallic film or foil. The film or foil itself may first have been reinforced by attaching a scrim (a loosely woven material) directly to the film or foil.

The web can be thermoformed, if it was so chosen as to contain thermoplastic synthetic resin fibers. Whether or not the web is thermoformed, it can form a reinforcement in a matrix of a suitable resin, foam, or adhesive, with which the reinforcement can be contacted by dipping, spraying, casting, coating, or injection molding.

To illustrate this, one preferred embodiment comprises an aluminum foil, which has been tacked onto a nonwoven batt of polypropylene and polyester fibers. A scrim of polyester has been adhered onto the aluminum foil. This entire structure is then embedded in a polyurethane matrix.

BRIEF DESCRIPTION OF THE DRAWINGS

FIG. 7 is a perspective view of an elliptically shaped satellite antenna dish, constructed in accordance with the invention.

FIG. 8 is a sideways sectional view showing a spherical parabolic antenna dish, and schematically showing a method of receiving radio or light wave transmissions from a radio or light wave transmissions source.

FIG. 9 is a sideview of an elliptically shaped parabolic antenna dish, showing an alternate arrangement for positioning a feed horn.

DETAILED DESCRIPTION OF THE PREFERRED EMBODIMENTS

Figure 1:
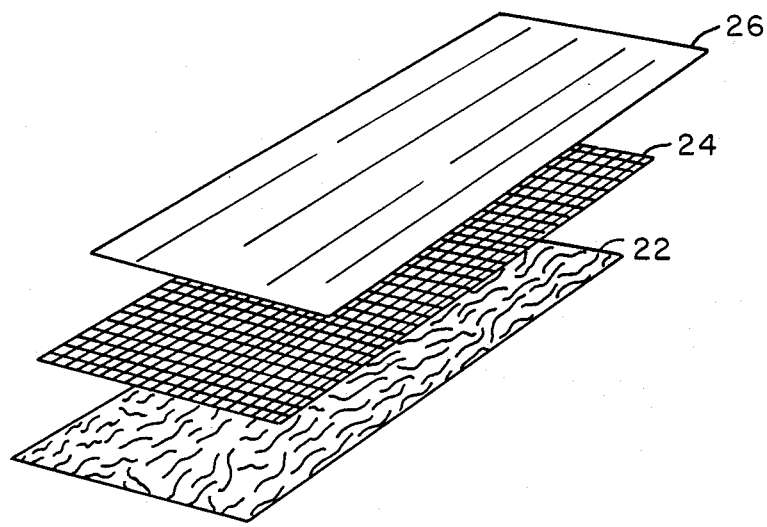
FIG. 1 shows an exploded view of the main structural components of the formable composite.
Figure 2:
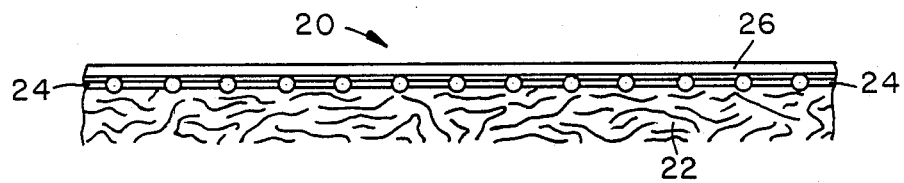
FIG. 2 shows the structural components illustrated in FIG. 1 in cutaway side elevational view after the components have been compacted and affixed to one another.

Turning first to FIG. 1, there is shown an exploded view of the basic sections of a preferred embodiment of the composite. A fibrous batt 22 is set adjacent to a loosely woven textile scrim 24, which in turn is set next to a foil 26. This preferred structural arrangement after integration is shown in cross-section in FIG. 2.

Figure 3:
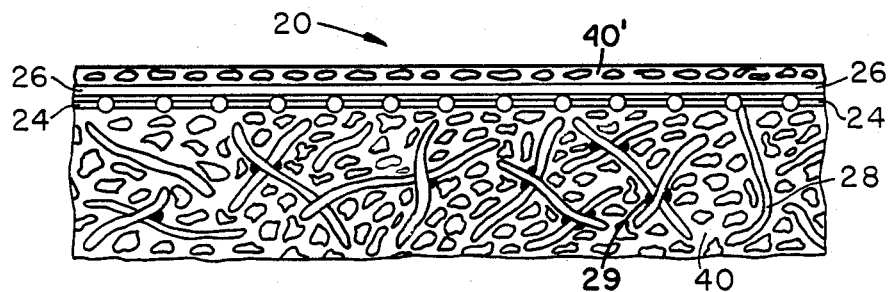
FIG. 3 is an expanded schematic cross-section of the composite in its reinforcement-matrix version showing foil and reinforcement fibers embedded in a solidified matrix phase.

Turning now to FIG. 3, there is shown schematically one embodiment of the reinforcement-matrix version of the composite. In the reinforced version, the reinforcing fibers 28 comprising the fiber batt 22 are embedded within a matrix phase 40, which is preferably a rigid foam. In a preferred embodiment, the foil layer 26 is also embedded within the foam with foam below the foil, 40 and above the foil, 40'. The degree to which the fibers 28 and the foil 26 are embedded within the matrix phase 28 may vary, and they are only completely embedded within the matrix phase in one particular embodiment.

Figure 4:
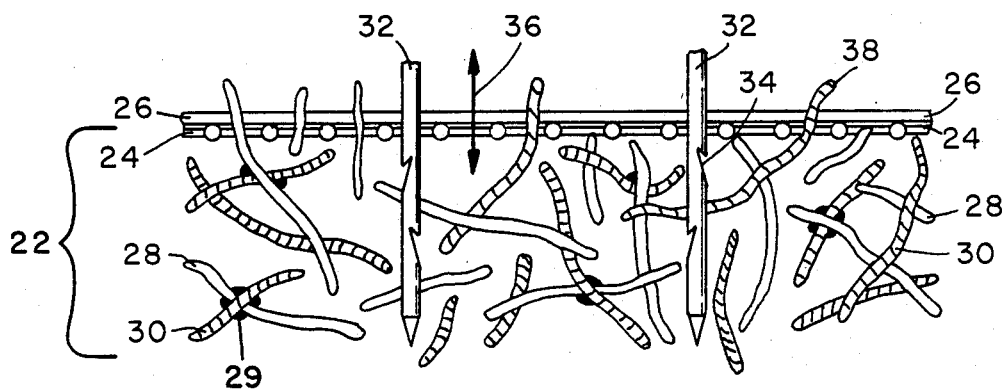
FIG. 4 schematically depicts the action of the needles of a needle loom upon the foil, scrim, and fibers of the composite during its preparation.

At FIG. 4 there is shown, in detail, the manner in which the fiber batt 22, the scrim layer 24, and the foil layer 26 are structurally unified in order to produce a preferred embodiment of the composite. First, however, FIG. 5 will be described, which is a schematic production line, and which more clearly shows the structure of the composite and the reinforcement-matrix version of the composite. A production transporting means 42, running generally in the direction of production 44, carries along a foil layer 26 from a foil layer supply 46. In one preferred embodiment, there is then laid onto the foil layer 26 a scrim layer 24, coming off of scrim supply 48. In a preferred embodiment, fibers 28 coming from a fiber source 50, are positioned on top of the scrim. The fibers 28 may be loose, unconsolidated fibers, or they may have been loosely consolidated in a batt by means of a carding operation through means well known to those skilled in the art. In the most preferred embodiment, second fibers 30 coming from a second fiber source 52 are added. Once again, these may be loose fibers, or they may be loosely consolidated along with the first fibers 28 by means of a carding operation, prior to their deposit on the foil-scrim layer. The loosely consolidated precursor 54 now consists of the foil layer 26, the scrim layer 24, a portion of first fibers 28, and a portion of second fibers 30.

Figure 5:
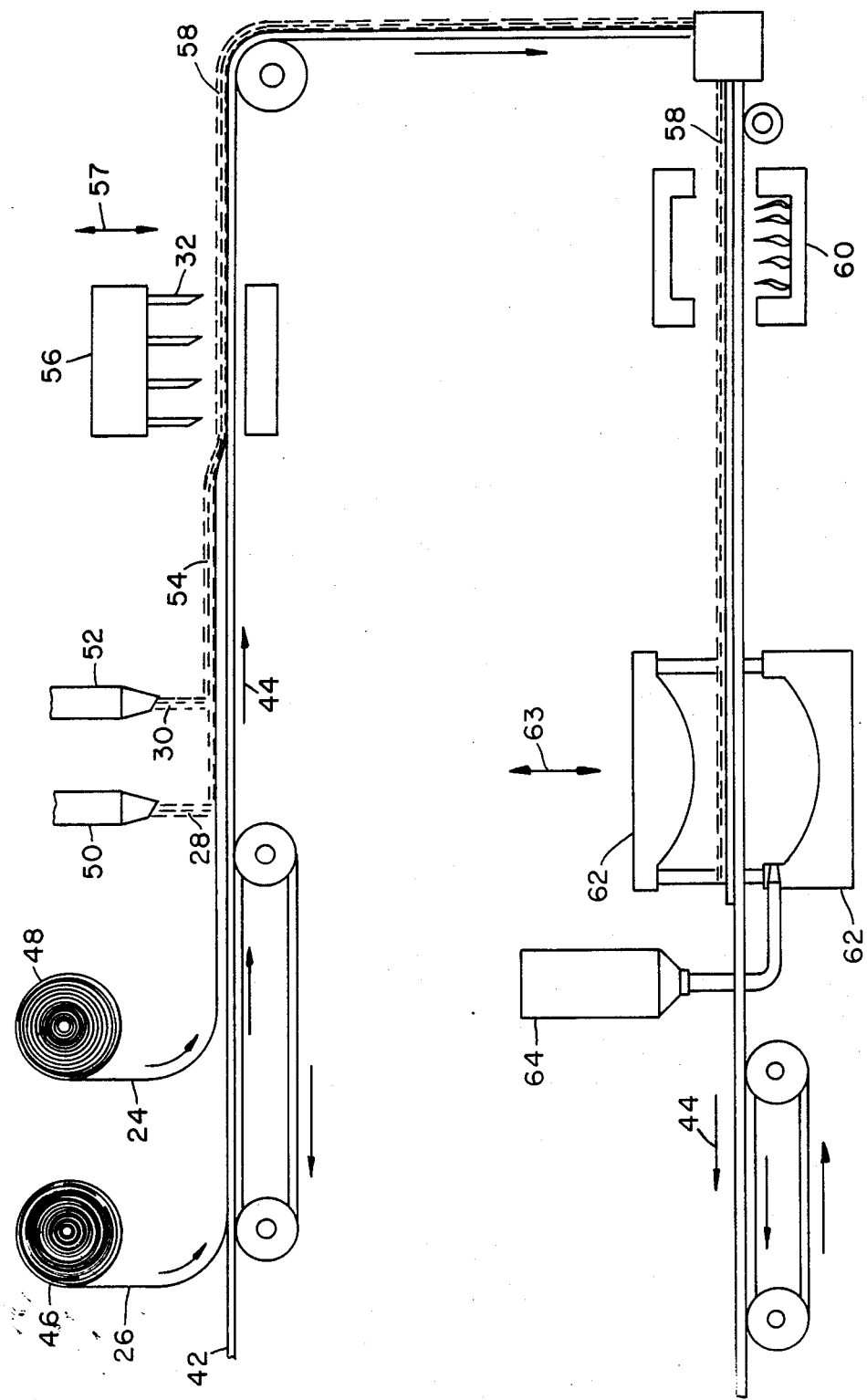
FIG. 5 schematically depicts an assembly line in order to show the preferred order in which the individual components of the composite can be formed.

The loosely consolidated precursor 54 is then subjected to the action of a needle loom 56. The needle loom moves reciprocally in up-and-down directions 57. The needles 32 punch through the loosely consolidated precursor 54, thereby consolidating and unifying it into a composite. Punching may be conducted on either side of the precursor. Hence, FIG. 5 shows the needles punching from the fiber side while FIG. 4 shows needles punching from the foil side. Punching is much more effective if conducted from the fiber side. Returning briefly to FIG. 4, punching action is shown in greater detail. The needle 32 moves reciprocally in up-and-down directions 36. The needles are equipped with downwardly oriented barbs 34. As the needle travels through its downward stroke, the barb 34 snags a fiber, which may be of a first type 28 or a second type 30, and then carries that fiber, to some extent, through the fiber batt 22, in a process tending to orient the fiber vertically and also tending to interengage the fibers with each other. In reverse-fishhook principle, when the needle 32 is in its upward stroke, snagging of fibers is greatly reduced. Some fibers will be pushed through the foil layer 26, when needle-punching is conducted from the fiber side. In its stroke cycles, when a needle punctures the foil, a shard of foil will, to some extent, interengage with adjacent fibers. Furthermore, when the foil is punctured by a needle in this process, a quality is imparted to the composite such that the composite as a whole is much more capable of being drawn without being torn, since the punched holes in the foil act as stress relievers. The antitearing qualities of the composite are further enhanced by the addition of a scrim layer 24 in a preferred embodiment.

Returning now to FIG. 5, the consolidated needle-punched composite 58 can then have several different operations performed on it, depending on what version of the composite is desired as an end product. The needle-punched composite 58 can be loaded into a furnace means 60 for heating. If all, or a portion of, the fibers chosen for the batt are synthetic thermoplastic resin fibers, they can be heated to their temperature softening point. At that point they will at least partially fuse to each other, as shown at 29 in FIGS. 3 and 4. The composite can then be transported to a molding means 62 to be contoured into a desired predetermined shape under pressure and possibly under additional heat.

Alternatively, the needle-punched composite 58 can be partially or fully embedded in a matrix phase (as shown in FIG. 3) by the addition of a matrix phase from a matrix phase supply 64 to form a reinforcement-matrix composite. The matrix phase can be any material which, while in a fluidized form, can be contacted with the needle-punched composite (by any means, including spraying, dipping, coating, casting, or injection molding, all according to means well known to those skilled in the art), which will sufficiently penetrate the interstices of the needle-punched composite, and which will then assume the desired structural properties upon curing.

In a most preferred embodiment of the reinforcement-matrix version of the composite, the matrix phase is polyurethane. Polyurethane can be contacted with the needle-punched composite by spraying, dipping, coating, casting, or injection molding, all by techniques well known to those skilled in the art. In the well-known art of injection molding, polyurethane is generally preceded by two or more chemical precursors, which are mixed together and are then forced into a molding means (e.g., reaction injection molding). Once in the molding means, the fluid-state polyurethane cures and solidifies. (See Becker, W. E., *Reaction Injection Molding*, 1979). In a most preferred embodiment of the present invention, the cured polyurethane forms the matrix phase by solidifying in and around the interstices of a quantity of reinforcing fibers held in the molding means.

Figure 6:
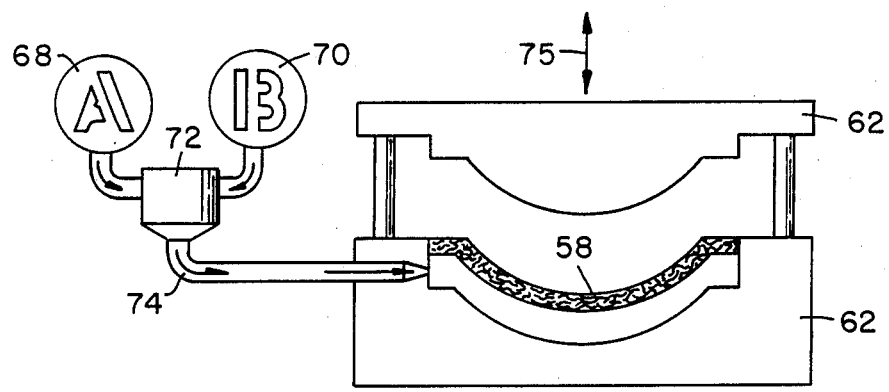
FIG. 6 schematically shows one example setup for the mixing and conduction of a matrix phase in fluidized form to be contacted with a foil-substrate laminate (a precuror to the final product in one embodiment of the composite) being held in a molding means.
Figure 6A:
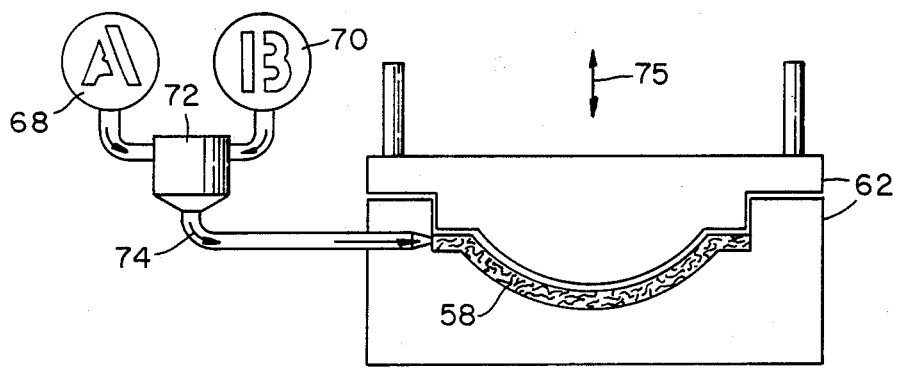
FIG. 6A shows the molding means of FIG. 6 in a closed position holding the foil-substrate laminate (or even just textile fiber substrate) secure, to be embedded in fluidized matrix phase that will subsequently harden, or alternatively, being held secure without addition of fluidized matrix in order to conform to the shape of the mold under heat and pressure.

A matrix phase may be added to an unmolded or uncontoured needle-punched composite, or it may be added to a contoured portion of needle-punched composite, established, for instance by the action 63 of molding means 62. Turning to FIGS. 6 and 6A, this is shown in more detail. The action 75 of molding means 62 will move a piece of needle-punched composite of reinforcing fibers that form a substrate 58 so as to be in contact with a conduit 74 that carries a fluidized matrix phase. The substrate 58 could have been preshaped to the contours of molding means 62, or it could be shaped by the closed molding means 62 of FIG. 6A, and the matrix phase forced into the molding means, in one continuous sequence of actions. In the embodiment using polyurethane, chemical precursors 'A' 68 and 'B' 70 are combined in a suitable mixing means 72 and then transported along conduit 74 to be contacted with substrate 58.

Depending on the structural properties of materials which are chosen for one of the given elements of construction of the composite, it will be appreciated by those skilled in the art that many variations of construction are possible without departing from the spirit and scope of the disclosed invention here.

Minimally (unless a matrix phase is included), the structural elements of the composite should include a foil layer and some type of a webbed batt, which batt has been attached to the foil to form a needle-punched composite. In a more preferred embodiment, there is a scrim that has been adhered to the foil layer to form a foil-scrim laminate, which laminate is then affixed to the webbed batt. The webbed batt 22 can be at least one weave of textile fibers, but preferentially is nonwoven fibrous batt of textile fibers. Suitable batts are commercially available from Gates Formed-Fibre Products, Inc., Auburn, Me. The foil 26 can be a metal, or composite laminate of two different metals, or a nonmetallic film or a composite laminate of at least one metal and at least one nonmetallic film, or even a composite laminate of at least two different nonmetallic films.

Most commonly, the foil layer will be affixed to the batt by being tacked to the batt by a needle loom. The tacking by the needle loom can be accomplished by one-sided or two-sided needling (punching). In one preferred embodiment the foil is aluminum. Alternatively, the foil could be a laminate of aluminum on mylar. The scrim 24 is generally a lightweight open weave coarse fabric, and can be cotton or a synthetic thermoplastic resin, particularly a polyester. Alternatively, the scrim may be a meshwork of a synthetic thermosetting resin. The scrim can be adhered to the foil by an adhesive that cures chemically or by an adhesive that cures after being subjected to heat. Alternatively, the scrim can be adhered to and set against the foil mechanically by a stitching means or a knitting means, according to methods well known to those skilled in the art.

The fiber batt 22 preferably will be a nonwoven batt of fibers of a synthetic thermoplastic resin. It will be apparent to those skilled in the art that alternatively these fibers could be a meshwork of a synthetic thermosetting resin, or they could be a nonwoven batt of fibers of a glass, or a nonwoven batt of fine shavings of a metal, as for example a steel wool, or finally could be a nonwoven batt of a cellulosic material, either a regenerated cellulosic such as a rayon, or a cellulosic such as excelsior. When fibers of a synthetic thermoplastic resin have been chosen for the batt, it is possible to choose more than one type of fiber and choose them so that the first of the two synthetic resins will have a lower temperature softening point than the second of the two synthetic resins. This may be by means of choosing two different resins, or by choosing two types of fibers of the same resin having different fiber characteristics, which will affect the temperature at which the fiber softens. Therefore, first fibers may, for instance, be taken from the group consisting of a polyethylene, a polypropylene, a polyester, a polyamide, a polyphenylene sulfide, and a polychlal. The fibers that are selected for the second fibers can be any of the above mentioned groups of fibers, so long as the criterion is met that the temperature softening point be higher than for the fibers chosen for the first fibers. Again, this is not necessarily a matter of choosing from a different chemical group, but may also be a matter of choosing fibers having different fibrous characteristics that affect temperature softening point.

Once the fibers have been selected, and to some degree consolidated into a nonwoven batt, the batt can be laid together with the foil-scrim laminate or it can be separately passed through a needle loom before the batt is affixed onto a foil, or a foil-scrim laminate. In a most preferred embodiment of the composite, the two fibers chosen are polypropylene and polyester, each constituting about 50% by weight of the batt. However, it will readily be appreciated that the percentages of polyester and polypropylene may vary in the mixture as desired.

The most preferred method of preparing the needle-punched composite is to adhere a foil onto a scrim to form a foil-scrim laminate, and then to affix the foil-scrim laminate onto a fibrous batt substrate by passing the foil-scrim laminate together with the batt substrate through a needle loom to form a needle-punched composite. This method produces a unique composite.

A different version of the composite is the contoured composite. In the contoured composite, there is first a sheet of foil. A scrim a may be adhered to form a foil-scrim laminate. A substrate is prepared, which preferably will be a nonwoven batt with fibers of at least one synthetic thermoplastic resin, and in a most preferred embodiment is a nonwoven batt of fibers of two synthetic thermoplastic resins which differ in their temperature softening points. The foil or foil-scrim laminate is then tacked onto the substrate by a needle loom to form a needle-punched composite, and then this composite is subjected to heat in an oven or furnace means by methods well known to those skilled in the art. (See Adams and Middleton, U.S. Pat. No. 4,424,250, the disclosure of which is incorporated herein by reference). The substrate fiber(s), which have the property of softening when heated for a period of time to the temperature of their softening point, and subsequently rehardening when they are cooled for a period of time, then will take the shape of a predetermined contour against which the needle-punched composite is set during at least part of the heating and cooling periods. This can be accomplished by thermoforming in a mold under conditions of heat and pressure according to methods well known to those skilled in the art.

Additionally, a version of the composite can be produced where the foil and scrim are omitted and only the batt substrate is embedded in the matrix phase. In its preferred embodiment, this version uses a batt substrate of at least one, and preferably two types of synthetic thermoplastic resin fibers which have been consolidated into a nonwoven batt. One type of fiber must be higher melting than the other type. The batt can either be heated and thermoformed prior to being embedded in the matrix phase, or an unformed batt can be fixed in a molding means into which fluidized matrix phase is forced. If the unformed batt is fixed in a molding means, then it can either be unheated, or preheated in an oven by means well known to those skilled in the art of thermoforming. Alternatively, the batt can be embedded in matrix phase by spraying, dipping, coating, or casting, by techniques and methods well known to those skilled in the art.

It will be apparent to those skilled in the art that the different versions of the composite are capable of a multitude of structural applications. To illustrate this, examples are provided below showing specific applications of different versions of the composite, although these examples are not meant to be limiting in terms of the possible applications of the composite and should not be so construed.

EXAMPLE I

There is shown generally in FIG. 7 a parabolic antenna dish for the sending and receiving of light wave and radio wave signals, made in accordance with the invention. (By this, it is intended to mean any electromagnetic wave signals.) This dish 76 can be manufactured in one piece or in two or more sections. FIG. 7 shows a configuration in which three sections 78, 80, and 82, have been separately manufactured and assembled to form the dish 76. The dish 76 is supported by an antenna dish support means 84. The dish may take on the configuration of either a planar section of a sphere as in FIG. 8, or a planar section of an ellipsoid as in FIG. 9. FIG. 8 shows a section of a spherical type parabolic dish, which has been set up to receive signals from a signal generating source 92. The signals travel in generally parallel lines 94, and are bounced off the dish along lines 96 towards a feed horn means 90, which is supported by a feed horn support means 88. FIG. 9, showing the elliptical type parabolic dish shows an alternative mounting arrangement for a feed horn means 90 and a feed horn support means 88, enabling a greater portion of the signals to impact the dish itself.

The parabolic antenna is structurally made using the reinforcement-matrix version of the composite, similar to the construction illustrated in FIG. 3 and method discussed in respect of FIGS. 6 and 6A. One starts with a substrate made with a webbed batt of fibers, in a preferred version 100% polyester fibers, and affixes this substrate to a foil layer, which most preferably is 0.3 mil aluminum that has been adhered onto a scrim. The scrim is most preferably of polyester of open cross weave, 2.4 oz/yd$^2$, and is affixed onto the substrate through needle punching, as described above. The consolidated needle-punched composite is then subjected to sufficient heat to thermoform the composite into a desired shape, whether it be spherical, elliptical, or otherwise. The needle-punched composite is then exposed to and embedded in a matrix phase, preferably a resin, and most preferably a polyurethane by the reaction injection molding means described above, to produce a reinforcement-matrix composite. A preferred polyurethane system uses polymeric diphenylmethane diisocyanate, polyether polyol resin, a tertiary amine catalyst, and trichloro-trifluoromethane blowing agent. Such a system is commercially available from Mobay Chemical Co., and it is designated Baydur 724. Depending upon the extent to which the aluminum foil would be embedded within the resin, the contoured rigidified composite could also be used to collect and concentrate solar energy rays made to reflect off of an exposed reflective metallic surface.

EXAMPLE II

Figure 10:
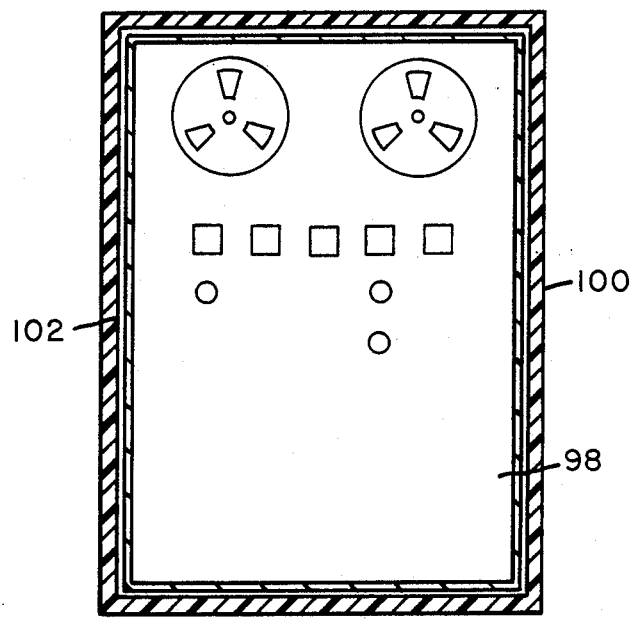
FIG. 10 is a front view and partial cutaway view of a typical computer that is housed within electromagnetic interference shielding constructed in accordance with the invention.
Figure 11:
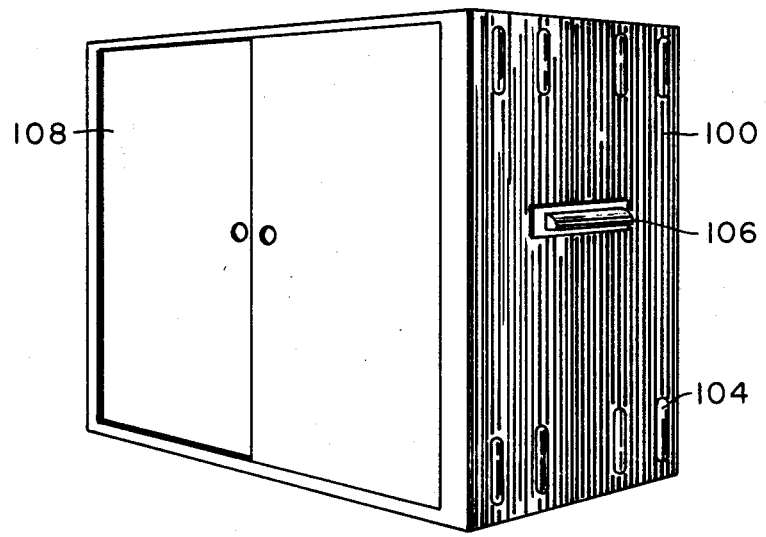
FIG. 11 is a view-in-perspective of the assembled computer electromagnetic interference shielding, with its access doors closed.

There is shown at FIG. 10 a typical computer means 98, which is encased about its periphery by an electromagnetic interference shielding housing 100 made in accordance with the invention, which is shown in a cutaway cross-section. Electromagnetic interference attenuation is achieved by the presence of a metallic foil, most preferably aluminum foil shown at 102. This is similar to the reinforcement-matrix construction illustrated in FIG. 3. At FIG. 11, the electromagnetic interference shield housing 100 is shown equipped with ventilation slots 104, at least one carrying or transportation handle 106, and at least one access door or access entry means 108.

One would start with a substrate, which is a webbed batt, preferably of nonwoven synthetic thermoplastic resin fibers, and most preferably a blend of approximately 50% of polypropylene, and approximately 50% polyester fibers. To the substrate there would be affixed a metal foil layer, most preferably an aluminum metal foil layer by the methods described above. After a consolidated precursor composite had been formed, it would then be subjected to heat and thermoformed to achieve a desired configuration to house a given computer or other piece of electronic equipment, by the thermoforming methods described above. The composite could be rigidified by exposing it to and embedding it in a matrix phase, preferably a resin, and most preferably a polyurethane, by methods described above. One or more ventilation openings would then be made in the housing, and necessary hardware, such as handles, would then be installed.

EXAMPLE III

Figure 12:
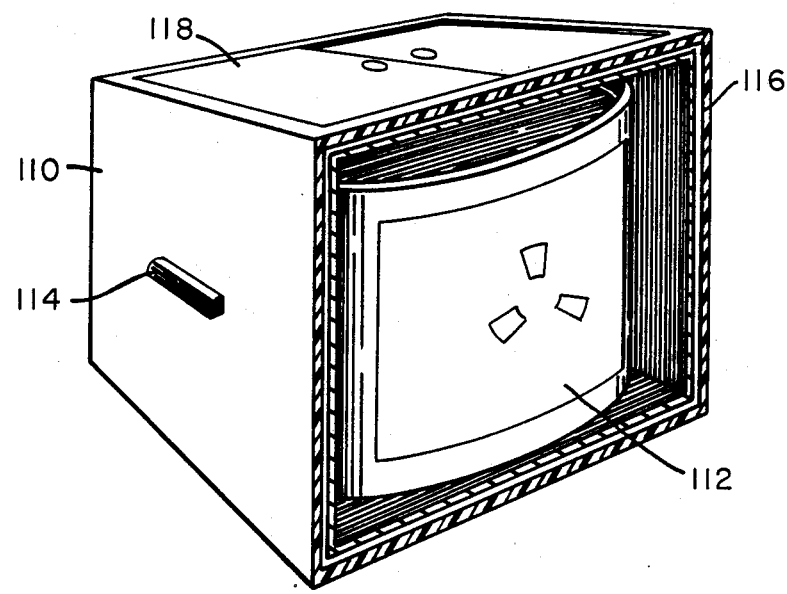
FIG. 12 is a partial perspective and partial cutaway view of a vessel holding a source of radioactive emissions that is housed within radiation attenuating shielding constructed in accordance with the invention.

At FIG. 12 there is shown, generally at 110, in partial cross-section and in partial perspective view, a housing for the attentuation of radioactive emissions. The housing 110 attenuates radioactive emissions from a source of radioactive materials 112 by means of a metallic foil 116, most preferably made of lead. The housing 110 is also shown to have at least one handle 114 to assist in carrying in transportation, and at least one access door or opening 118. The radioactive emission attenuation housing would be constructed from the reinforcement-matrix version of the composite. One would begin with a substrate, most preferably of nonwoven fibers of one, and more preferably two different synthetic thermoplastic resins, and most preferably fibers of polyethylene and polyester. To this substrate there would be affixed, either by needle looming, or more preferably by adhesive fixation, a foil layer using lead foil. Having consolidated the fibrous portion of the composite using methods described above, the composite would be contoured to take on a preselected shape sufficient to house a given source of radioactive emissions, using thermoforming techniques described above. The contoured composite would then be rigidified by exposing it to, and at least partially embedding it in, a matrix phase, preferably a resin, and most preferably a polyurethane, using the methods described above. This construction would provide a unique method for the attenuation of radioactive emmissions from various sources containing radioactive materials.

EXAMPLE IV

A batt of nonwoven fibers of approximately 50% polypropylene and approximately 50% polyethylene is prepared by carding. A foil of aluminum is laid onto the batt, and the foil and batt are attached and consolidated by needle-punching. After consolidating the materials down to an overall thickness of approximately one inch, the combination is then thermoformed to take on the shape of a predetermined architectural panel. The resulting panel can be installed in architectural applications, having good thermal reflective and sound deadening qualities.

EXAMPLE V

A batt of nonwoven fibers of approximately 50% Nomex ® aramid fibers and approximately 50% polyphenylene sulfide fibers is prepared by carding. A foil of aluminum is laid onto the batt, and the foil and batt are attached and consolidated by needle-punching. The combination is then thermoformed to conform to the shape of a section of an aircraft fuselage, into which it is installed, having good fire-retardant qualities and good electromagnetic interference shielding qualities.

EXAMPLE VI

A batt is prepared of approximately 50% polyester fibers and approximately 50% polypropylene fibers, by carding. The batt is consolidated to a thickness of approximately one-half an inch by needle-punching. The batt is then heated in an oven means to a range of approximately 320–350 degrees fahrenheit, at which point the polypropylene softens. The batt is then fixed into a molding means, the mold is closed, and polyurethane resin is injected. Upon curing, the mold is released, resulting in a panel being produced, which has a high strength-to-weight ratio, and is useful as rigid architectural fascia.

EXAMPLE VII

A batt of nonwoven fibers is prepared of approximately 50% polypropylene and 50% polyester fibers, by carding. The batt is then consolidated to approximately one-fourth of an inch in thickness by needle-punching. After being heated in an oven means to a temperature range of approximately 320–350 degrees fahrenheit, the batt is fixed in a molding means to be molded to a desired configuration. After removal from the molding means, one side of the molded article is sprayed with foamed urethane, using a Glascraft ® spray system to apply Thermocell Tufspray ® foamed urethane, and then spray on a backer of Urylon ® 6686-201. Upon curing, a rigidified part is produced.

Also, it should be noted that the combustion resistance of the composite can be greatly increased by selecting as one of the fibers of the substrate, a combustion resistant substance, as for example, polyphenylene sulfide.

It is thought that the composite of the present invention, and many of its attendant advantages, will be understood from the foregoing description, and it will be apparent to those skilled in the art that various changes may be made to the form, construction and arrangement of the parts thereof without departing from the spirit and scope of the invention or sacrificing all of its material advantages. The forms herein described are merely preferred embodiments and the description herein should not be construed or interpreted to be restricted to these forms as the only embodiments, and the following claims should therefore be interpreted as broadly as is reasonable.

What is claimed is:

1. A contoured composite comprising:
   a sheet of foil;
   a substrate, which substrate is nonwoven batt of fibers of at least one synthetic thermoplastic resin;
   the foil being tacked onto the substrate by a needle loom to form a composite; and
   the substrate fibers, having the property of softening when heated for a period of time to the temperature of their softening point and subsequently rehardening when cooled for a period of time, taking the shape of a predetermined contour against which the composite is set during at least part of the heating and cooling periods.

2. The contoured composite as claimed in claim 1, further comprising a scrim, which scrim is adhered to the foil to form a foil-scrim laminate.

3. A reinforcement-matrix composite comprising:
   a substrate, which substrate is a webbed batt of nonwoven synthetic resin fibers and is a reinforcement phase;
   a foil layer affixed to said substrate by needling; and
   a matrix phase in which at least part of the substrate is embedded, and which matrix phase is a resin.

4. A composite, as claimed in claim 3 further comprising a scrim adhered onto the foil layer to form a foil-scrim laminate, said laminate being affixed to said substrate by needling.

5. A composite, as claimed in claim 3, in which the matrix phase has embedded within it at least part of the foil layer.

6. A composite, as claimed in claim 3, in which the synthetic resin is a synthetic thermoplastic resin.

7. A composite, as claimed in claim 3, in which the synthetic resin is a synthetic thermosetting resin.

8. A composite, as claimed in claim 7, in which the synthetic thermosetting resin is a polyurethane.

9. A composite, as claimed in claim 8, in which the polyurethane is a foam.

10. A composite, as claimed in claim 9, in which the foam is flexible.

11. A composite, as claimed in claim 9, in which the foam is rigid.

12. A composite, as claimed in claim 3, wherein said substrate is substantially completely embedded within said matrix phase.

13. A composite, as claimed in claim 12, wherein said foil layer is substantially completely embedded within said matrix phase.

14. A composite structure comprising:
   a substrate formed of a webbed batt;
   a hardened resin matrix phase in which at least a portion of the substrate is embedded; and
   a foil layer is needled to the webbed batt, and which foil layer is at least partially embedded in the matrix phase, and which foil is a metal suitable for the attenuation of radioactive emissions.

15. The structure, as claimed in claim 14, which has been fabricated to a predetermined selected shape sufficient to house a source of radioactive emissions.

16. The structure, as claimed in claim 14, in which structure there is at least one opening into which an access door is installed.

17. The structure, as claimed in claim 14, in which the metal foil is lead.

18. A parabolic antenna comprising:
   a substrate formed of a webbed batt;
   a hardened resin matrix phase, in which at least a part of the substrate is embedded; and
   a foil layer needled onto the webbed batt, and which is at least partially embedded in the matrix phase.

19. The antenna, as claimed in claim 18, further comprising a scrim, which scrim is adhered onto the foil layer to form a foil-scrim laminate.

20. The antenna, as claimed in claim 18, in which the foil is aluminum.

21. The antenna, as claimed in claim 18, which is substantially shaped as a section of a sphere.

22. The antenna, as claimed in claim 18, which is substantially shaped as a section of an ellipsoid.

23. The antenna, as claimed in claim 18, which is comprised of two or more separate sections that have been individually manufactured and subsequently assembled.

24. A structural housing for an electronic apparatus comprising:
   a substrate formed of a webbed batt;
   a hardened resin matrix phase, in which at least a part of the substrate is embedded; and
   a foil layer needled onto the webbed batt, and said foil layer is at least partially embedded in the matrix phase.

25. The article, as claimed in claim 24, which houses a computer apparatus.

26. The article, as claimed in claim 24, in which the foil is aluminum.

27. The article, as claimed in claim 24, in which housing there is incorporated at least one opening for ventilation of the electronic apparatus kept within the housing.

28. The article, as claimed in claim 24 into which housing there is installed at least one handle means for grasping and transporting the housing.

29. The article, as claimed in claim 24, in which there is at least one opening into which an access door is installed.

30. A method for manufacturing a contoured composite, which comprises the steps of:
   affixing a foil onto a fibrous batt substrate of nonwoven fibers of at least one synthetic thermoplastic resin by passage of the foil and the substrate through a needle loom to form a composite;
   heating the composite for a period of time to the temperature of softening point of at least one synthetic thermoplastic resin, the heated composite being set against a predetermined contour; and
   cooling the heated, contoured composite.

31. The method, as claimed in claim 30, in which the fibrous batt substrate of nonwoven fibers is made up of at least two types of fibers of synthetic thermoplastic resins, with the fibers of a first synthetic thermoplastic resin having a lower temperature softening point than the fibers of a second synthetic thermoplastic resin.

32. The method, as claimed in claim 30, further comprising the step of adhering a scrim onto a foil to form a foil-scrim laminate, which is then affixed onto a fibrous batt.

33. The contoured composite made in accordance with the method of claim 30.

* * * * *